(12) United States Patent
Begley et al.

(10) Patent No.: US 6,490,238 B1
(45) Date of Patent: Dec. 3, 2002

(54) CD TRANSPORT TRAY DRIVE HAVING ELASTOMERIC DRIVE WHEEL SURFACE

(75) Inventors: Paul V Begley, Loveland, CO (US); Gregory A Standiford, Loveland, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/493,993

(22) Filed: Jan. 28, 2000

(51) Int. Cl.$^7$ ............................................... G11B 33/02
(52) U.S. Cl. ...................................................... 369/75.2
(58) Field of Search ............................... 369/77.1, 75.1, 369/75.2

(56) References Cited

U.S. PATENT DOCUMENTS 5,195,078 A * 3/1993 Ikedo et al. ................ 369/75.2
5,617,395 A * 4/1997 Choi .......................... 369/77.1

* cited by examiner

Primary Examiner—David Davis (57) ABSTRACT

A CD transport tray can be driven by a powered wheel made of an elastomeric material, or by a wheel 42' having an elastomeric material on its rim surface that engages (through a friction-based driving action) an elongated strip on the CD transport tray. In the alternative, the elongated strip 38' can be provided with an elastomeric strip 110' or both the wheel 42' and the elongated strip 38' may be provided with an elastomeric strip.

11 Claims, 6 Drawing Sheets

Fig. 1

(Prior Art)

CD TRANSPORT TRAY DRIVE HAVING ELASTOMERIC DRIVE WHEEL SURFACE

BACKGROUND OF THE INVENTION

1. Field of the Invention

This invention generally relates to transport trays used to insert and extract compact disks ("CDs") into and out of CD drives ("drive(s)"). More particularly, this invention relates to the CD transport tray drive mechanisms used to power transport trays into and out of these drives.

2. Statement of the Problem

Reading from, and writing to, a CD involves loading and unloading the CD into and out of a CD drive. These loading and unloading operations are usually carried out by a CD transport tray. For example, copying information stored on a first CD onto a second, blank CD is often accomplished by (1) placing the information-containing first CD on a CD transport tray, (2) loading said tray (and the first CD that rests upon it) into a drive, (3) copying information on the first CD on a hard drive component of the system, (4) unloading the first CD from the disk transport tray, (5) replacing the first CD with the second, blank CD, (6) loading the tray (and the second, blank CD resting on it) back into the drive, (7) copying the information taken from the first CD and stored in the hard drive onto the second CD, and (8) removing the transport tray (and the second CD resting upon it) from the drive. In order to do all of this, the transport tray must be moved laterally from a fully open position, where the compact disk can be placed on the tray (or removed from it), to a fully closed position (such that a CD on the tray is placed in a specific operating position inside the drive) where the CD is "read from" or "written to" and thereafter moved back to its fully open position (such that the second CD on the tray is again carried outside of the drive so that it can be removed from said tray). A mechanical drive mechanism provides the powered lateral motion needed to move the tray back and forth between its fully open position and its fully closed position.

Most prior art CD transport tray drive mechanisms employ rack and pinion gear systems. The rack is an extended, bar-like, member having gear teeth along a major portion of its length. These teeth engage the teeth of a powered pinion gear. The rack component of such a system is usually on the underside of the tray. The powered, pinion gear is attached to another part of the drive. When engaged with the pinion gear, the rack is driven laterally as the pinion gear rotates. Depending on the direction in which the pinion gear rotates, the CD transport tray is either driven into or out of the drive.

These rack and pinion transport tray drive mechanisms are powered by electrical motors capable of being driven in either a clockwise direction or a counterclockwise direction. Such electrical motors have a drive shaft that is connected to a pulley head. The motor pulley head is connected to mechanical means for transmitting the rotary motion of the motor pulley head to the gear train. For example, the motor pulley head may be connected to an elastic belt or band that is, in turn, connected to a gear train pulley head. Thus, the powered rotation of the motor is transmitted to the gear train pulley head via movement of the belt. This causes the gear train to drive the pinion gear which, in turn, causes the rack to be driven laterally.

Those skilled in this art, also will appreciate that the electrical motors used in such transport tray drives turn at speeds or angular velocities that are greater than the desired speeds of such pinion gears. Thus, the speed of the pinion gear relative to the speed of the motor drive shaft must be reduced. This is generally done by a series of gears in a gear train wherein a first, driving, gear has a diameter that is smaller than a second, driven, gear with which the first gear engages. This "gearing down" in transport tray drive mechanisms is usually repeated through use of two or three succeeding gear pairs wherein succeeding driving gears have a smaller diameter than the driven gear. Eventually the last gear in these gear trains is connected to a pinion gear that rotates at a speed that is less than the speed of the motor shaft.

The engagement of the teeth of the pinion gear with the teeth of the rack can, however, create potentially harmful stresses in the individual teeth of the pinion gear and/or of the rack. This mechanical engagement also tends to produce noises having sound levels that are sometimes greater than about 70 decibels. Such sound levels are generally regarded as being esthetically undesirable in the CD drive industry. Heretofore, these potentially harmful stresses (and unaesthetic sounds) have been mitigated by the "give", "play", "cushioning effect", etc. that is provided the engaging action of the rack and pinion by a certain degree of "slippage" in the pulley system that connects the motor to the gear train. For example, if the engagement of the teeth of the pinion gear with the teeth of the rack is particularly stressful, the pulley belt can momentarily "slip" with respect to the turning pulley heads and thereby relieve the stress between the engaging teeth of the rack and pinion gears.

This prior art method of relieving the potentially damaging stresses placed on engaging and disengaging rack and pinion gears does however have certain drawbacks. For example, this method of relieving such stresses requires the use of three mechanical elements (i.e., a motor pulley head, a gear train pulley head and a pulley belt that connects them) that all add to the cost and mechanical complexity of transport tray drive mechanisms. Problems also arise from the fact that the pulley belts that connect the motor to the gear train tend to lose their elasticity and/or break over time.

SUMMARY OF THE INVENTION

Applicants have found that the potentially harmful forces (and unaesthetic noises) created by stressful rack and pinion gear engagements and/or disengagements in CD tray drive mechanisms can be greatly reduced through use of friction-based, engaging surfaces that are used in place of gears. Thus, instead of a pinion gear having teeth, applicants' transport tray drive mechanism employs a drive wheel that is made of an elastomeric material or, in the alternative, employs a drive wheel having a rim that is made of, or covered by, an elastomeric material such as a natural or synthetic rubber. That is to say that the rim of the wheel may be made of an elastomeric material by virtue of the fact the drive wheel itself is made of an elastomeric material, or the drive wheel may be provided with a "tire-like" rim which is made of an elastomeric material. This wheel or a rubber rim thereof is placed in friction-creating contact with a strip or bar on the transport tray. In other words, this strip or bar does not have teeth such as those employed in the rack component of prior art transport tray drive mechanisms. Such a strip or bar is elongated (i.e., it runs over a major part of the length of the tray) and is preferably made in an injection molding operation that creates a monolithic tray/strip or bar component. The strip or bar also may be provided with a strip of elastomeric material. These engaging surfaces (be they elastomeric materials or polymeric materials) may have textured, or smooth outermost surfaces. An elastomeric strip placed on the polymeric strip or bar may be the same elastomeric material from which the drive wheel or the drive wheel rim is made—or the elastomeric strip can be made of a different elastomeric material. The resulting elastomeric material-to-elastomeric material engagement may give better traction then an elastomeric material wheel or rim/molded polymeric material system.

Use of this arrangement, implies that any potentially stressful forces produced by engagement of such a drive wheel and such a strip or bar on the tray are compensated for "on the spot" by the "give", "cushioning effect", "slippage", etc. provided by the natural elasticity of the elastomeric material on the rim of the drive wheel (and, optionally, by any elastomeric material on the strip or bar on the transport tray). Thus, any potentially damaging forces created by the friction engagement of the rim of the drive wheel and the strip on the tray are not transmitted through the gear train as they are in the prior art case previously described where the give, cushioning effect, etc. is provided by slippage of a pulley belt—after the potentially damaging forces are transmitted through the gear train. The cushioning effect provided by the elastomeric rim of the drive also serves to lower those noises associated with the operation of the CD. Applicants also have found that the manufacturing tolerances for the moving parts of the drive mechanisms of this patent disclosure can be increased while fewer parts than a belt system are required. This implies that the cost of the hereindescribed CD transport trays will be less than gear driven mechanisms.

Thus, at its most fundamental level, applicants' invention employs a powered drive wheel having a radial drive surface, rim, etc. that is made of an elastomeric material (rather than gear teeth such as those on pinion gears) and which, by means of a friction-based driving action, engages a flat strip, bar, etc. on the transport tray in order to power said tray into or out of the CD drive. This flat strip, bar, etc. on the tray may be provided with a strip of elastomeric material (rather than gear teeth such as those on prior racks) that serves to create friction-based forces between the drive wheel and the strip or bar on the tray. It might also be noted here that, for the purposes of this patent disclosure, the expressions "smooth, radial drive surface, rim, etc." should be taken to imply that the drive wheel has no gear teeth on its radial, strip-engaging, surface, rim, etc. Other parts of the drive wheel, however, may well be provided with gear teeth (e.g., such as those that engage with a gear in the gear train that is connected to the motor). Similarly, the expressions "flat strip, bar, etc." on the tray should be taken to imply that the strip, bar, etc. has no gear teeth on its rim-engaging surface.

The elastomers used to create applicants' friction-based, tray driving actions can be made from a wide variety of natural or synthetic elastomeric materials. Such materials are usually polymers possessing elastic (rubbery) properties. These polymers are typically comprised of molecules that are, for the most part, multiples of certain low-molecular-weight monomer units. By way of example only, the rim and/or strip elastomeric surfaces used in this invention could be made of isoprene (2-methylbutadiene-1,3) which is made up of $C_5H_8$ molecules. Polyisoprene, which is made of $(C_5H_8)_x$ monomer units (wherein x normally runs from about 1,000 to about 10,000) also could be used for this purpose. Those skilled in this art will appreciate that, although they differ in composition from natural rubbers, many such high-molecular-weight polymeric materials are termed "synthetic rubbers". In any case, other synthetic elastomeric materials that could be used in the practice of this invention would include, but not be limited to, styrene-butadiene rubbers, butyl rubber, acrylonitrile-butadiene rubbers, polyurethanes, polyacrylate elastomers, silicone elastomers and ethylene-propylene elastomers.

DETAILED DESCRIPTION OF THE INVENTION

Figure 1:
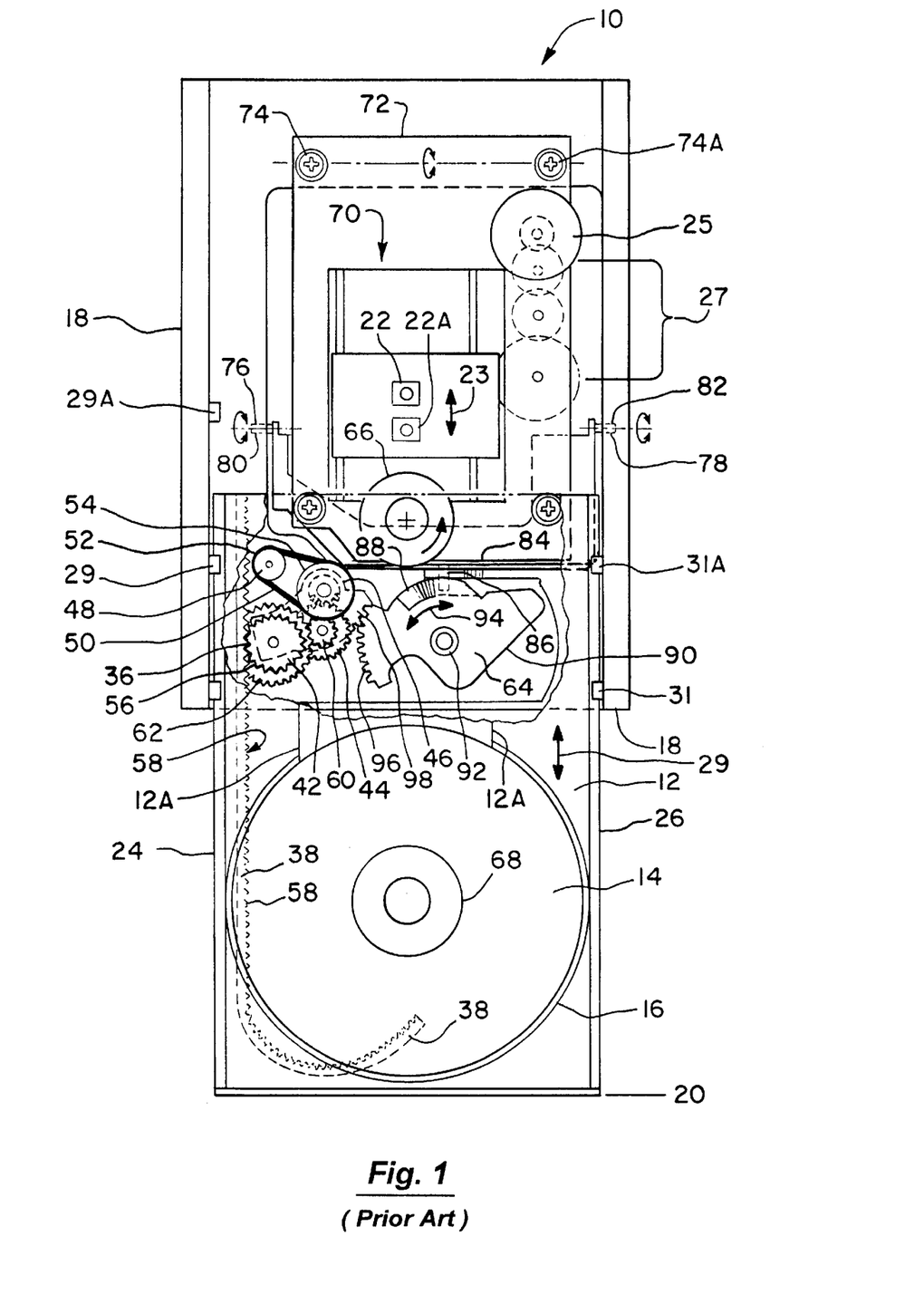
FIG. 1 is a plan view of a prior art CD transport tray drive mechanism.

FIG. 1 is a plan view of a prior art CD drive ("drive") 10. The drive 10 includes a slidable transport tray ("tray") 12 upon which a compact disk ("CD") 14 is placed. The CD 14 preferably is placed in a CD-shaped depression 16 in the tray 12 in order to hold the CD 14 in a fixed location on said tray. The CD 14 can be placed on (or removed from) the tray 12 while it is positioned outside the drive's housing 18 in the extended, external position generally depicted by line 20. The transport tray 12 is driven into the drive 10, or driven out of said drive, by reversing the rotation direction of an electrical motor (not shown in FIG. 1) that powers the transport tray drive mechanism. In the tray's fully inserted position, data stored on a CD 14 resting on the tray 12 can be read by the drive's read head—or a blank portion of a CD can be written upon through use of various writing technologies such as those focused laser beam/phase change media material technologies well known to this art. Such reading or writing operations are usually done on the underside of a CD 14 through use of read/write head(s) 22, 22A, etc. located in a lower region of the drive 10 under the tray 12 when said tray is positioned in the drive 10. To this end, the tray 12 is provided with an opening 12A that allows opto/electromagnetic communication between the underside of the CD 14 and the drive's read/wrote head(s) 22, 22A, etc. Such drives also have a capability for moving the read/write heads back and forth in the lateral direction generally depicted by arrow 23. These movements are usually powered by a separate motor 25 and gear system 27.

The left side 24 and right side 26 of the tray 12 (when it is turned right side up as shown in FIG. 1) are each provided with respective slide surfaces 28 and 30 (see FIG. 2) that allow the tray to slide laterally in to and out of the drive housing 18 in the manner generally depicted in FIG. 1 by the two-headed arrow 29. The slide surfaces 28 and 30 can, for example, slide on ledges such as those shown as items 29, 29A and 31, 31A in FIG. 1. To this end, the slide surfaces 28 and 30 are preferably on the lowest parts 32 and 34 of the underside of the tray 12 when it is in its normal slidable relationship on ledges 29, 29A and 31, 31A, etc.

Figure 2:
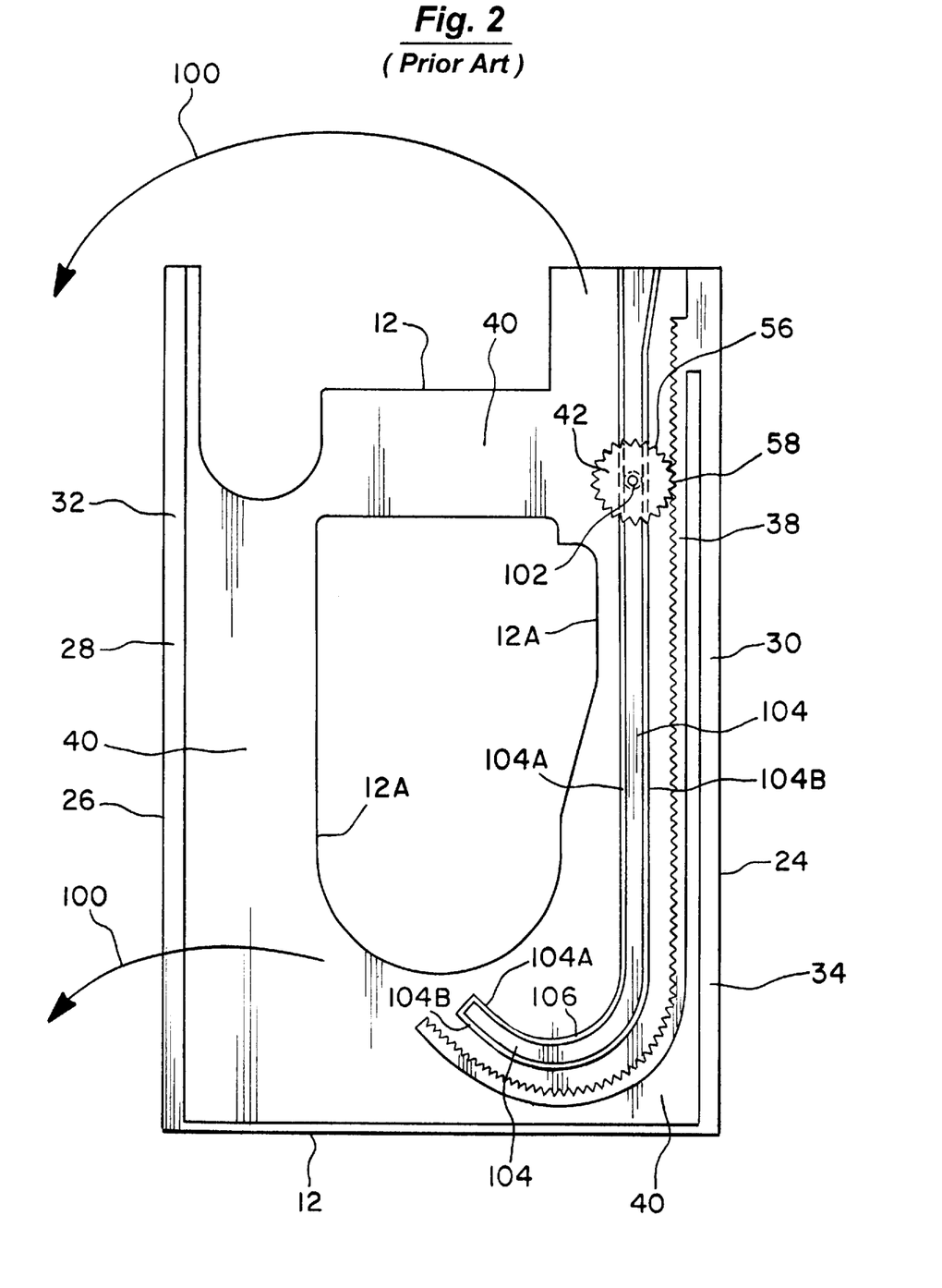
FIG. 2 is a plan view of the underside of the prior art CD transport tray shown in FIG. 1.

Be the tray sliding mode of operation as it may, the tray 12 in most prior art CD drives is driven by a rack and pinion gear engagement 36. In such a rack and pinion engagement, the rack 38 is usually a part of the underside 40 of the tray 12. Typically, such a tray 12 is made by molding a polymeric material in a manner such that the rack is a monolithic component of the overall molded tray 12. The pinion gear 42 that drives the rack 38 is usually the end element of a gear train 44 that is provided with a gear train pulley head 46. The gear train 44 is driven by an electrical motor (not shown) whose powered drive shaft is connected to a motor pulley head 48. In many such prior art drives, the motor pulley head 48 is connected to the gear train pulley head 46 by a belt 50 made of an elastomeric material. As previously noted, slippage of a prior art pulley belt 50 with respect to the rim 52 of the motor pulley head 48, and/or with respect to the rim 54 of the gear train pulley head 46, serves to cushion any forces created when the teeth 56 of a prior art pinion gear 42 stressfully engage with (or disengage from) the teeth 58 of the rack 38.

The gear train 44 also generally serves to give the pinion gear 42 an angular velocity that is less than the angular velocity of the motor pulley head 48. This reduction in the angular velocity of the pinion gear 42, relative to that of the motor pulley head, is achieved through use of a series of gears wherein gear pairs have a smaller gear (smaller in diameter) that drives a larger gear (larger in diameter than the smaller gear). For example, in FIG. 1, smaller gear 60 drives larger gear 62. The net effect of this "gearing down" (usually in two or three stages produced by two or three gear pairs) is that the pinion gear 42 has an angular velocity that is less than (e.g., only about one fourth to one tenth of) the angular velocity of the motor drive shaft (not shown) and the motor pulley head 48 affixed to it. This gearing down also, in effect, increases the torque delivered by the pinion gear 42 to the rack 38.

Next, it should be noted that many prior art transport tray drive mechanisms also are mechanically connected to a CD spindle engaging system 64. These spindle engaging systems have many different mechanical designs. For the purposes of illustration only, such a spindle engaging system will be depicted as a spindle engaging system 64 that causes a CD 14 positioned in the drive 10 to be engaged by, and rotated by, a CD spindle 66 when the rack 38 and pinion 42 are not actively engaged with each other. As will be noted in the verbal descriptions associated with FIGS. 2, 3, 4 and 5, use of a second operating position of such a prior art spindle engaging system 64 will cause the CD 14 to be disengaged from the CD spindle 66 when the rack 38 and pinion 42 are engaged with each other. This engagement of the spindle head 66 with a hole 68 in the center of the CD 14 is accomplished, in part, (other elements needed for this operation are not shown in FIG. 1) by raising a lift plate 70. The rear end 72 of the lift plate 70 is loosely attached to an element (not shown) of the overall drive 10 by loosely fitting bolts 74 and 74A. The lift plate 70 is also provided with pivots 76 and 78 that cooperate respectively with pivot receivers 80 and 82 in the drive. These pivot/pivot receiver systems operate in a manner such that the forward parts of the lift plate 70 can be raised or lowered. To this end, the front edge 84 of lift plate 70 is provided with a lift plate pin 86 that projects into a lift tower 88 that is an integral part of a ramp plate 90 that is rotatably mounted on an axle 92. The ramp plate 90 is free to rotate in a clockwise, or counterclockwise, direction in the manner generally indicated by the two-headed direction arrow 94 shown on the ramp plate 90. The right side of the ramp plate 90 is shown provided with teeth 96 that engage with a drive wheel positioning device 98 whose operation will be more fully discussed in the descriptions of FIGS. 4 and 5.

FIG. 2 shows the underside 40 of the tray 12 shown in FIG. 1. The tray 12 has a cut out region 12A that defines an opening through which opto/electrical signals may pass. This view also suggests that when the tray 12 is flipped over (i.e., turned over 180 degrees) in the manner suggested by arrows 100, it will be in the position shown in FIG. 1. FIG. 2 also shows the teeth 56 of pinion gear 42 engaged with the teeth 58 of the rack 38. The pinion gear 42 is preferably mounted on a post having a nub 102 that is free to slide in a guide channel 104 formed in the underside 40 of the tray 12 by two parallel channel sides 104A and 104B. The channel 104 serves to guide the pinion gear 42 in a parallel relationship with the rack 38. Such a guide channel 104 (and the rack with which it is associated) often end in a curved portion 106. When the nub 102 of the pinion gear 42 is in the extreme depth of the curved trough portion 106 of the channel 104, the tray is more firmly placed in its fully closed position within the drive 10.

Figure 3:
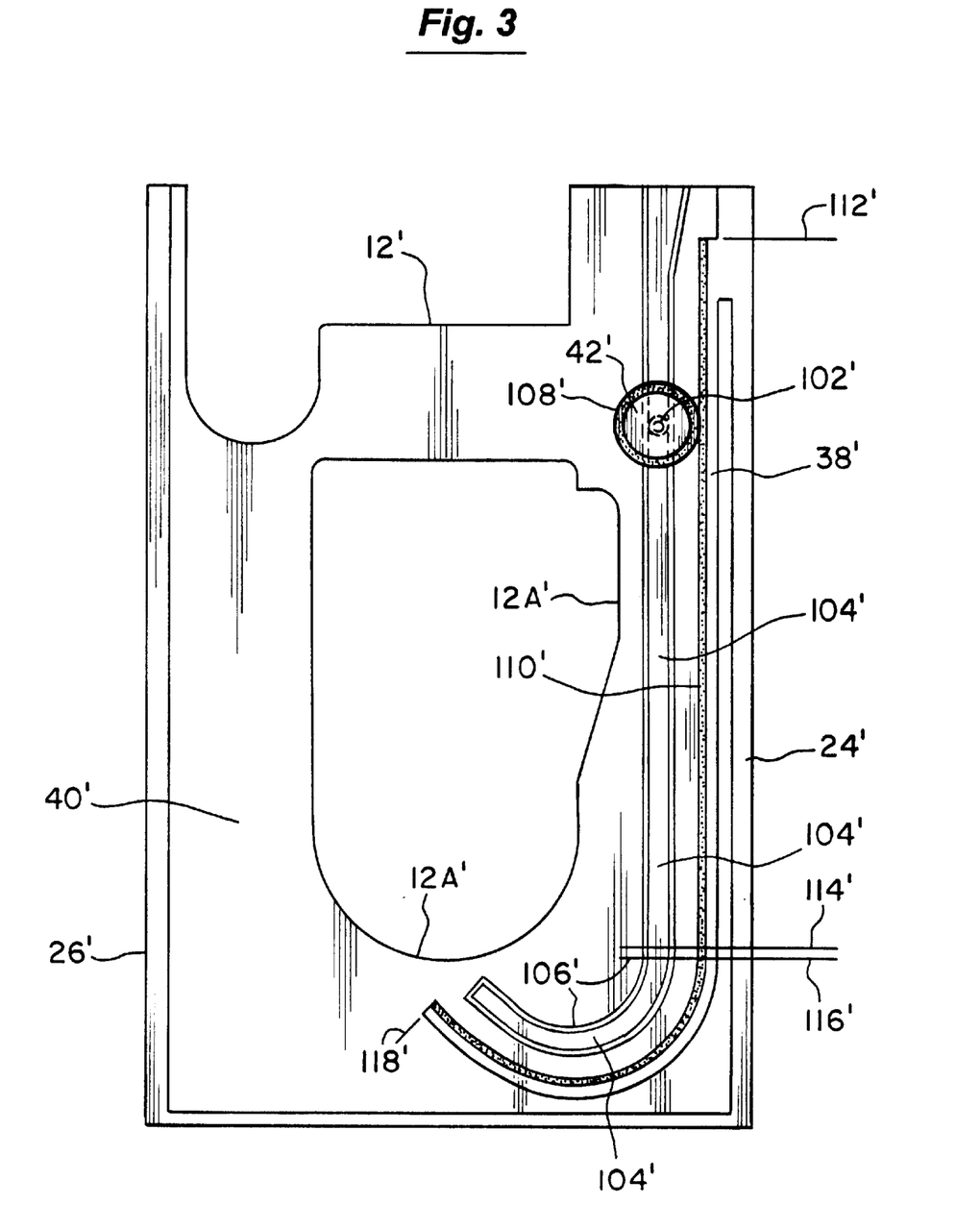
FIG. 3 is a plan view of the underside of a CD transport tray and drive mechanism made according to the teachings of this patent disclosure.

FIG. 3 shows the underside 40' of a tray 12' made according to the teachings of the present patent disclosure. Most of the elements of applicants' tray 12' are the same as those of the prior art tray 12 shown in FIGS. 1 and 2. Hence, applicants will use the same item designation numbers used in FIG. 2, but add a prime mark to those item numbers used in FIGS. 1 and 2 in order to differentiate the prior art items from the elements used in applicants' present invention. Thus, element 12 in FIG. 2 becomes element 12' in FIG. 3 and so on. FIG. 3 does, however, fully illustrate some of the main features of the present invention which do not appear in FIG. 2. The item numbers used for the features used to described applicants' invention in FIGS. 3 through 7 will also include a prime mark. For example, these features include the fact that the drive wheel 42' can be made of an elastomeric material, or the rim of the drive wheel 42' can be covered with a layer of elastomeric material 108'. In alternative modes of operation of this invention, the rim surface of the drive wheel 42' is not provided with an elastomeric material 108', while the elongated strip 38' is provided with an elastomeric strip 110'. In yet another alternative, both the drive wheel 42' and the elongated strip 38' are provided with elastomeric material surfaces 108' and 110'0 respectively. In FIG. 3, an layer of elastomeric material 108' (or rim 108' if the drive wheel itself is constructed out of an elastomeric material) on the drive wheel 42' is shown in a friction-creating engagement with a strip or layer of elastomeric material 110' on the bar 38'. Such a strip 110' could be screwed or glued to the bar 38'. This invention also contemplates another embodiment wherein there is no strip of elastomeric material 110' on the bar 38'. Thus, in this other embodiment, the elastomeric rim 108' of drive wheel 42' would make friction creating contact with a face surface of the bar 38' itself. Thus, the elastomeric rim 108' of the drive wheel 42' would make friction engagement with a strip of the molded polymeric material from which the molded tray was made. FIG. 3 also illustrates that neither the rim 108' of the drive wheel 42' or the rim-engaging face surface of the bar 38' have gear teeth such as those shown on the prior art rack and pinion drive mechanism depicted in FIG. 1.

FIG. 3 also suggests two additional embodiments of the present invention. In the first additional embodiment, the rim 108' of the drive wheel 42' would contact only an elongated straight portion region of a bar 38' that runs substantially from a top end 112' to a bottom end 114' of said bar 38'. These two ends serve to define the fully open and fully closed positions of the transport tray. Each of these positions may be associated with an electrical switch (not shown) that forms a component of an open/closed position logic system. In the second embodiment the elongated straight portion of the bar 38' extends on into a curved portion 106' comparable to the curved portion 106 shown in the prior art tray drive mechanism shown in FIG. 2. Positioning the axle of the wheel 42 in the deepest part of the trough region (near lead in to item number 104' in FIG. 3) serves to "lock" or hold the tray 12 in its fully inserted position. That is to say that when the drive wheel 42' is near line 112', the tray 12 is in its fully open position (see item 20 in FIG. 1). Conversely, when the drive wheel 42' is in the lower region of the curved portion 106 of the bar (i.e., near the lead in line of item number 104') the tray is in its fully inserted position in the drive 10. As in the prior art drive mechanism depicted in FIG. 2, applicants' drive wheel 42' also can be provided with a post (not shown) having a nub 102' that follows a channel 104'. Thus, depending on the embodiment, the channel 104' may end at point 114' or it may extend on through point 116' to point 118' at the end of the curved portion 106' of the channel 104'.

Figure 4:
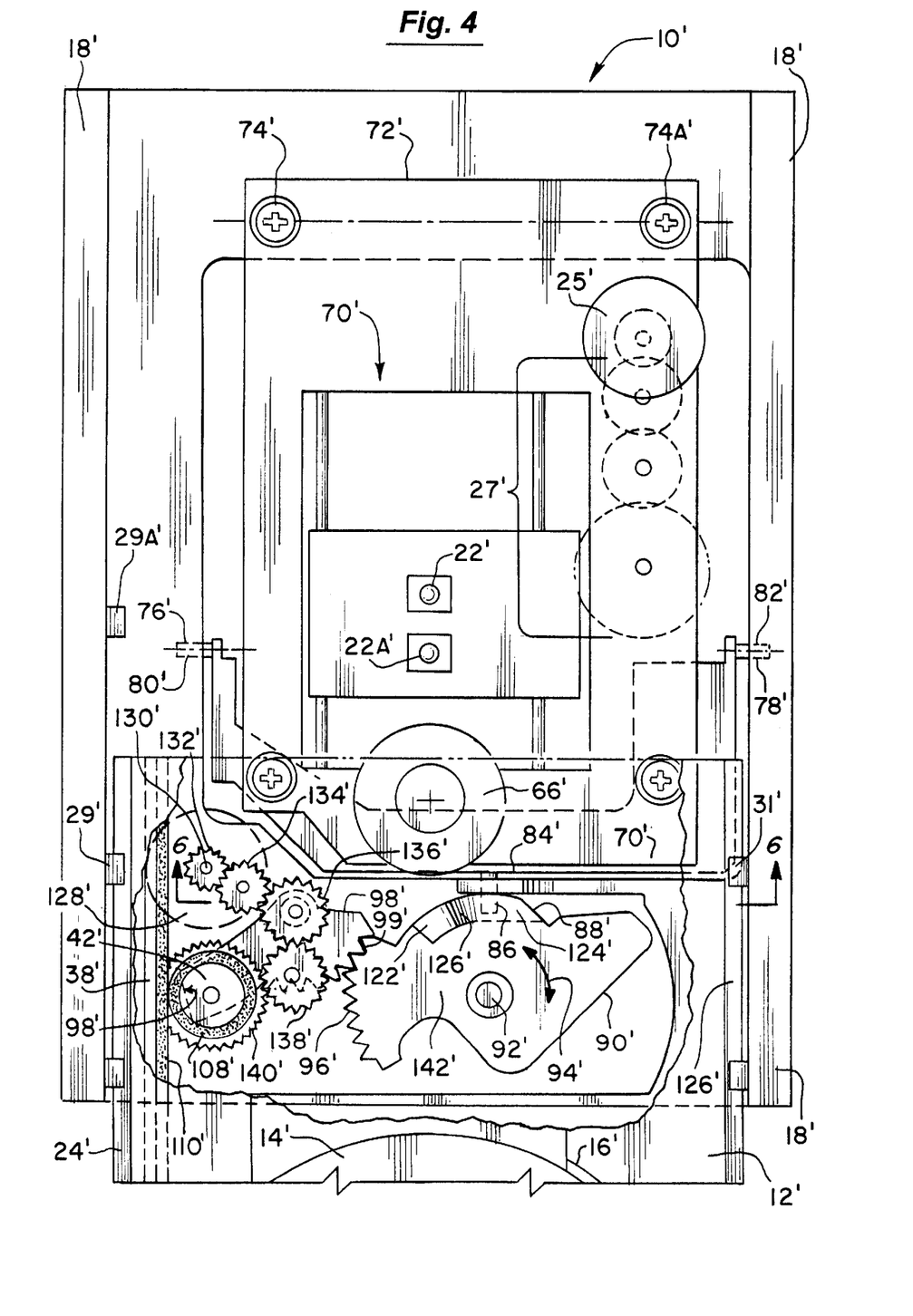
FIG. 4 is a plan view of a transport drive mechanism made according to the teachings of this patent disclosure in a position wherein the drive wheel is in friction-producing contact with a drive bar (provided with an elastomeric strip) on the underside of the transport tray and wherein a lift plate is in a depressed operating position.

FIG. 4 depicts the drive 10' of this patent disclosure in a first operating position wherein the elastomeric rim 108' of the drive wheel 42' is in friction engagement with a strip of elastomeric material 110' on a bar 38' on the underside of the tray 12'. In this first operating position, the tray 12' has been driven out of the housing 18' to the tray's fully extended position such that a CD 14' can be removed from the depression 16' in the tray 12'. The drive 10' in FIG. 4 also is shown provided with an electrical motor 128'. The drive shaft 130' of said motor is affixed to a first gear 132' which drives a second gear 134', which drives a third gear 136', which in turn drives a fourth gear 138, which drives a gear 140' that is affixed to the drive wheel 42'. In effect, the rim 108' of drive wheel 42' is mounted over the gear 140' but is still a fixed part of said gear 140'. Consequently, as the gear 140' is turned by the preceding gear train (i.e., gears 138', 136', 134' and 132') the drive wheel 42' is powered in either a first direction (e.g., clockwise) or the opposite direction (e.g., counterclockwise). This gear train may employ from any number of gears in order to "gear down" the speed of the drive wheel 42' relative to the speed of the motor 128' and/or supply any desired torque to the drive wheel 42'. It also should be noted that use of an elastomeric drive wheel rim allows greater flexibility (relative to toothed gears) in designing "center-to-center" distances of the rim's ability to be compressed to varying degrees as it friction engages the bar 38'. Thus in the preferred embodiments of this invention it is preferred that either the drive wheel rim or the bar have an elastomeric contact surface.

With respect to this example of a method of engaging a spindle and a CD, the drive wheel 42', gear 138' and gear 136' are shown mounted on a drive wheel positioning plate 98'. This drive wheel positioning plate 98' is rotatably mounted on an axle (not shown) and has teeth 99' that engage with the teeth 96' of a rotatable, ramp plate 90'. The top surface 142' of the ramp plate 90' is provided with a pin lift tower 88' in which the lift pin 86' resides. The lift pin 86 is affixed to the front edge 84' of the lift plate 70'. The pin lift tower 88', into which the lift pin 86' projects, has three regions; an upper region 122', a lower region 124' and a ramp region 126' that interconnects the upper region 122' with the lower region 124'. The lift pin 86' can move into any of these three regions depending on the degree of rotation 94' of the ramp plate 90' about its axle 92'.

When the lift plate pin 86' is in the lower region 124' of the pin lift tower 88', e.g., in the manner depicted in FIG. 4, the front edge 84' of the lift plate 70' is in its lower or depressed position. In this lower or depressed position of the lift plate 70', the spindle 66' is not engaged with a CD. Thus, such a CD is not being spun by the spindle 66'. When the ramp plate 90' is rotated in a clockwise direction (note arrow 94' is bi-directional), the lift plate pin 86 will be driven up an inclined plane 120' (see FIGS. 6 and 7) of the ramp region 126' of the tower 88' and on into the upper region 122' of said tower. In raising the lift pin 86' from the bottom region 124l to the top region 122' of the tower 88', the lift pin 86' raises the front edge 84' of the lift plate 70'. This action—in conjunction with the action of other mechanical devices not shown—serves to engage the spindle 66' with the center hole 68 of a CD. Turning the ramp plate 90' in a counterclockwise direction (again, see arrow 94') will cause the lift plate pin 86' to side down the inclined plane 120' of the ramp region 126' and go into the bottom region 124'. This action lowers the leading edge 84' of the lift plate 70' and causes the spindle head 66' to come out of a working engagement with a center hole 68' in a CD.

Figure 5:
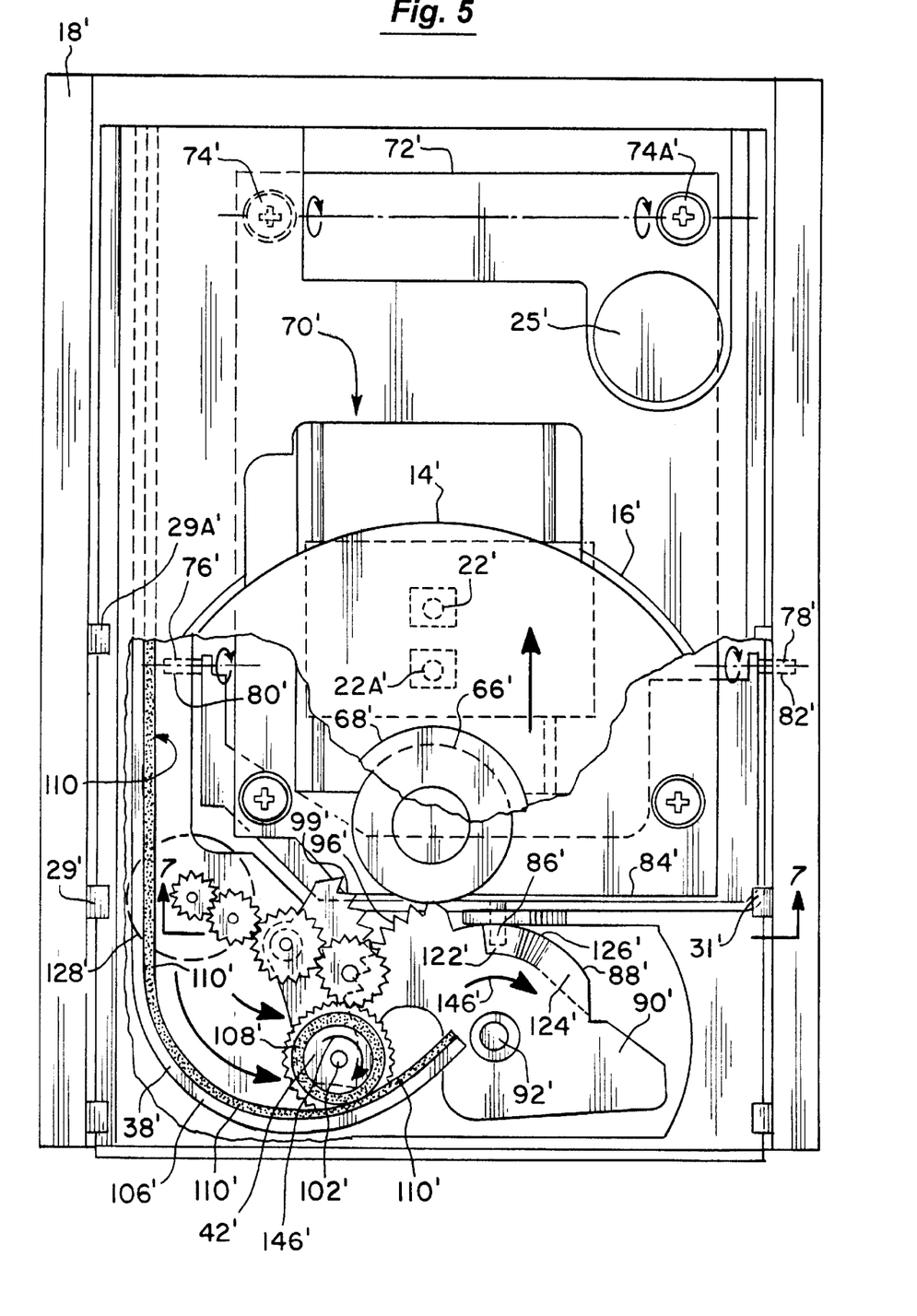
FIG. 5 is a plan view of the transport drive mechanism of this patent disclosure in a position wherein the drive wheel is in a friction-producing engagement with a curved portion of the drive bar on the underside of the transport tray and wherein a lift plate is in a raised operating position.

FIG. 5 shows the drive 10' in a second operating position wherein the ramp plate 90' has been rotated in a clockwise direction 146' to such an extent that the lift plate pin 86' has been forced into the upper region 122' of the lift pin tower 88'. This action causes the front edge 84' of the lift plate 70' to be raised to its second, or raised, position. When the lift plate 70' is in this second position, the spindle 66' will become engaged with the center hole 68' in CD 14'. FIG. 5 also illustrates the embodiment of this invention wherein the bar 38', and a layer of elastomeric material 110' attached to said bar 38', have a curved region 106'. In this arrangement, the rotation 146' of the drive wheel 42' is preferably stopped by electrical signals sent to the motor 128' via electrical circuitry not shown in FIG. 5. In an alternative embodiment of this invention, the rim 108' of the drive wheel 42' can be taken out of friction-creating contact with the elastomeric strip 110' on the bar 38'. This would be the case, for example, if the curved region of the bar 38' (and strip 108') did not exist. For example, FIG. 3 depicts a case wherein those portions of the bar 38' and the elastomeric strip 110' between points 116' and 118' are not employed.

Figure 6:
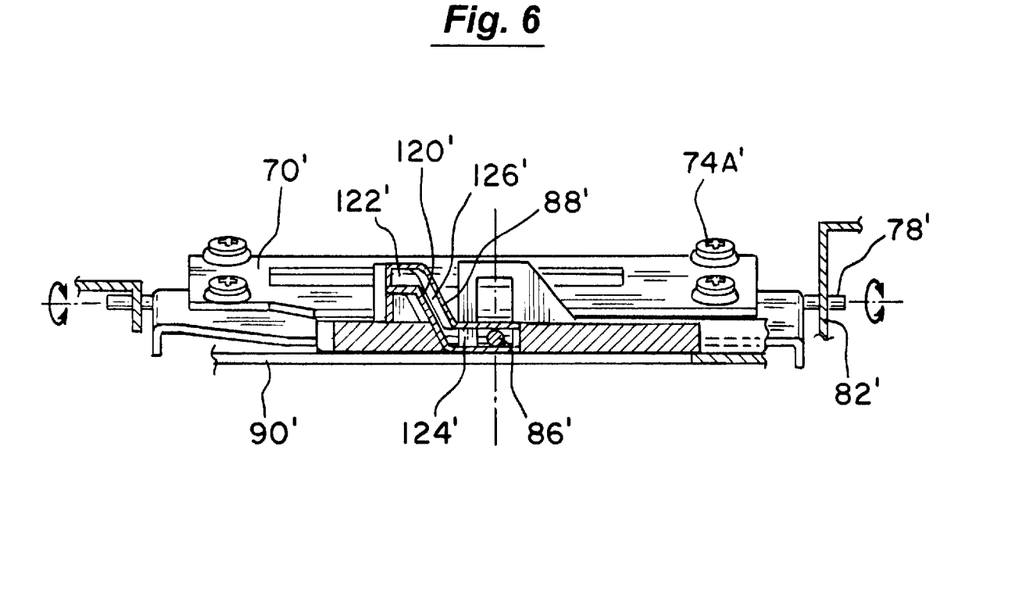
FIG. 6 is a cut-away elevation view of a CD transport tray drive mechanism of this patent disclosure showing the drive mechanism in its depressed operating position wherein the CD is out of engagement with a spindle.

FIG. 6 presents a perspective view of the lift plate 70' combined with a front view of the pin lift tower 88'. The pin lift tower 88' is shown having three regions in which the pin 86' is free to move according to the degree of rotation of the ramp plate 90' (see arrow 146' in FIG. 5). The pin lift tower 88' has an upper region 122' and a lower region 124' which are interconnected by a ramp region 126' having an inclined plane surface 120' that forms a slide surface between the upper region 122' and the lower region 124'. This slide surface serves to lift the lift pin 86' from the lower region 124' where it resides in FIG. 6 to the upper region 122' where it resides in FIG. 7 when the ramp plate 90' is rotated in the clockwise direction 146' indicated in FIG. 5.

Figure 7:
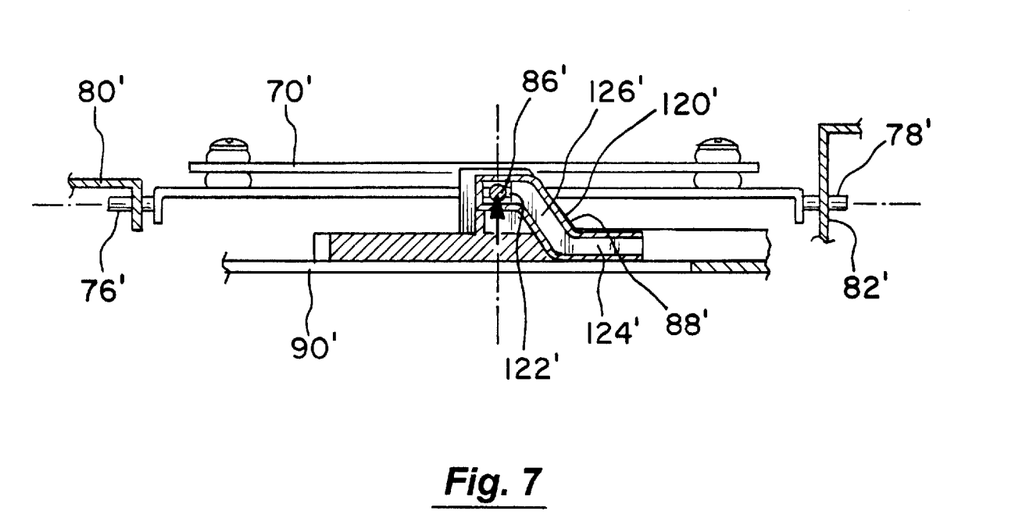
FIG. 7 is a cut-away elevation view of the CD transport tray drive mechanism of this patent disclosure showing the drive mechanism in its raised operating position wherein the CD is in engagement with a spindle.

FIG. 7 shows the front edge 84' of the lift plate 70' in its raised position. Again, this position is achieved when the lift plate pin 86' is forced to slide up the inclined plane 120' of ramp region 126' and into the upper region 122' of the lift tower 88' when the ramp plate 90' is rotated in the clockwise direction depicted by arrow 146' in FIG. 5.

Having thus disclosed this invention, it remains only to be said that various changes therein may be made without departing from its spirit and scope. Thus, the present invention is limited only by the claims given below.

We claim:

1. A compact disk transport tray drive mechanism comprising a compact disk transport tray, drive wheel, elongated bar, powered shaft and gear train; and wherein:
    (1) the powered shaft (a) is rotated in a first direction that powers a compact disk transport tray into a compact disk drive, and then in a second, opposite, direction that powers said compact disk transport tray out of the compact disk drive, (b) rotates at a first angular velocity and (c) engages a gear train;
    (2) the gear train (a) engages the powered shaft, (b) has a drive wheel having a gearless radial surface capable of making friction engagement with an elongated bar having a gearless surface and (c) rotates the drive wheel at a second angular velocity that is less than the first angular velocity at which the powered shaft rotates; and
    (3) the compact disk transport tray (a) is slidably mounted for lateral movement into the compact disk drive and (b) includes the elongated bar having the gearless surface that makes a friction engagement with the gearless radial surface of the drive wheel as said drive wheel rotates and thereby powers the tray into the compact disk drive as the powered shaft rotates in the first direction and then powers the tray out of the compact disk drive as the powered shaft rotates in the second, opposite, direction.

2. The transport tray drive mechanism of claim 1 wherein the drive wheel is comprised of an elastomeric material.

3. The transport tray drive mechanism of claim 1 wherein the drive wheel has a rim comprised of an elastomeric material.

4. The compact disk transport tray drive mechanism of claim 1 wherein the elongated bar is provided with a strip of elastomeric material that makes friction-based driving action with the drive wheel.

5. The transport tray drive mechanism of claim 1 wherein the drive wheel has a rim comprised of an elastomeric material and the elongated bar is provided with a strip of elastomeric material that makes a friction-based driving action with the rim of the drive wheel.

6. The compact disk transport tray drive mechanism of claim 1 wherein the elongated bar is straight over its entire length.

7. The compact disk transport tray drive mechanism of claim 1 wherein the elongated bar has a curved surface that serves to hold the transport tray in a fully inserted position in a compact disk drive.

8. A compact disk transport tray drive mechanism comprising:
    (1) an electrical motor having a powered shaft that (a) is rotated in a first direction to power a compact disk transport tray into a compact disk drive, and rotated in a second, opposite, direction that powers said compact disk transport tray out of the compact disk drive, (b) rotates at a first angular velocity and (c) engages a gear train;
    (2) a gear train that (a) engages the powered shaft of the electrical motor, (b) has a first operating position that causes a drive wheel, that is driven by the gear train and provided with a gearless radial surface, to make a friction engagement with a bar having a gearless surface and positioned on an underside region of the transport tray, (c) rotates the drive wheel at a second angular velocity that is less than the first angular velocity at which the powered shaft of the electrical motor rotates and (d) has a second operating position that causes the drive wheel to be taken out of engagement with the bar having a gearless surface; and
    (3) a compact disk transport tray that (a) is slidably mounted for lateral movement into and out of the compact disk drive and (b) further comprises a bar having a gearless surface that makes friction engagement with the gearless radial surface of the drive wheel as said drive wheel rotates and thereby powers the tray into the compact disk drive as the electrical motor rotates in a first direction, and powers the tray out of the compact disk drive as said motor rotates in a second, opposite, direction.

9. A method of operating a compact disk transport tray drive mechanism, said method comprising:
    (1) providing a compact disk transport tray, electrical motor, drive wheel, elongated bar, powered shaft and gear train in a mechanically cooperating system;
    (2) rotating a powered shaft of the electrical motor in a first direction that powers a compact disk transport tray into a compact disk drive, and in a second, opposite, direction that powers said compact disk transport tray out of the compact disk drive;
    (3) engaging the powered shaft with a gear train that (a) has a first operating mode that causes a drive wheel that is driven by the gear train, and which is provided with a gearless radial surface, to make a friction engagement with a bar having a gearless surface and which is positioned on an underside region of the transport tray and wherein said first operating mode lowers a lift plate in order to disengage a compact disk from a spindle that drives said compact disk and (b) has a second operating mode that causes the drive wheel to be released from engagement with the bar and wherein said second operating mode raises the lift plate in order to engage the compact disk with the spindle and (c) rotates the drive wheel at a second angular velocity that is less than the first angular velocity at which the powered shaft of the electrical motor rotates; and
    (3) engaging the gear train with a compact disk transport tray that (a) is slidably mounted in a compact disk drive and (b) further comprises the bar having a gearless surface that makes friction engagement with the gearless radial surface of the drive wheel as said drive wheel rotates and thereby powers the tray into the compact disk drive as the electrical motor rotates in the first direction and powers the tray out of the compact disk drive as the powered shaft rotates in the second, opposite, direction.

10. The method of claim 9 wherein the drive wheel travels in a straight line as it engages the bar having a gearless surface.

11. The method of claim 9 wherein the drive wheel travels over a curved surface in order to hold the transport tray in a fully inserted position in the compact disk drive.

* * * * *